United States Patent
Zhou et al.

(10) Patent No.: US 12,056,547 B2
(45) Date of Patent: Aug. 6, 2024

(54) METHOD FOR GENERATING A QUICK RESPONSE CODE AND PRINTING APPARATUS

(71) Applicant: Elo Touch Solutions, Inc., Milpitas, CA (US)

(72) Inventors: Haolai Zhou, Shanghai (CN); Yin Sun, Shanghai (CN); Jinwei Zhang, Shanghai (CN)

(73) Assignee: ELO TOUCH SOLUTIONS, INC., Knoxville, TN (US)

( * ) Notice: Subject to any disclaimer, the term of this patent is extended or adjusted under 35 U.S.C. 154(b) by 0 days.

(21) Appl. No.: 17/774,082

(22) PCT Filed: Dec. 17, 2020

(86) PCT No.: PCT/US2020/065566
§ 371 (c)(1),
(2) Date: May 3, 2022

(87) PCT Pub. No.: WO2021/141747
PCT Pub. Date: Jul. 15, 2021

(65) Prior Publication Data
US 2022/0374664 A1 Nov. 24, 2022

(30) Foreign Application Priority Data
Jan. 10, 2020 (CN) .......................... 202010024132.3

(51) Int. Cl.
*G06K 15/02* (2006.01)
*H04N 1/40* (2006.01)

(52) U.S. Cl.
CPC ..... *G06K 15/1878* (2013.01); *H04N 1/40012* (2013.01)

(58) Field of Classification Search
CPC ...................... G06K 15/1878; H04N 1/40012
See application file for complete search history.

(56) References Cited

U.S. PATENT DOCUMENTS

| | | | |
|---|---|---|---|
| 8,891,126 B2 * | 11/2014 | Tufano | G06F 3/1285 358/1.18 |
| 2006/0215931 A1 | 9/2006 | Shimomukai | |
| 2008/0082430 A1 | 4/2008 | Kamata | |
| 2012/0069408 A1 * | 3/2012 | Tsutsumi | G06F 16/93 358/474 |
| 2014/0029026 A1 * | 1/2014 | Saida | H04N 1/32325 358/1.9 |
| 2016/0275443 A1 | 9/2016 | Hosokane | |

OTHER PUBLICATIONS

International Search Report and Written Opinion directed to related International Patent Application No. PCT/US2020/065566, dated Mar. 15, 2021; 8 pages.

\* cited by examiner

*Primary Examiner* — Quang N Vo
(74) *Attorney, Agent, or Firm* — Sterne, Kessler, Goldstein & Fox P.L.L.C.

(57) ABSTRACT

The present disclosure relates to a method for generating a quick response QR code and a printing apparatus, a method for generating a quick response (QR) code, comprising obtaining an original image of the QR code, wherein the original image of the QR code is a bitmap image and is a color image or a grayscale image; obtaining information contained in the QR code; and generating a monochrome image of the QR code based on the information.

17 Claims, 4 Drawing Sheets

METHOD FOR GENERATING A QUICK RESPONSE CODE AND PRINTING APPARATUS

CLAIM OF BENEFIT TO PRIOR APPLICATIONS

This application claims priority to Chinese Patent Application No. 202010024132.3, filed on Jan. 10, 2020, which is hereby incorporated by reference in its entirety.

TECHNICAL FIELD

The present disclosure relates to a method for generating a quick response code and a printing apparatus.

BACKGROUND

Currently, Quick Response (QR) codes are widely used in daily life. In many situations, the QR codes will be printed out for the customers to scan and identify.

SUMMARY

According to an aspect of the present disclosure, there is provided a method for generating a quick response (QR) code, comprising: obtaining an original image of the QR code, wherein the original image of the QR code is a bitmap image and is a color image or a grayscale image; obtaining information contained in the QR code; and generating a monochrome image of the QR code based on the information.

In some embodiments of the present disclosure, the original image of the QR code may be included in a first image, and the method may further comprise determining a position of the original image of the QR code in the first image; and overlaying the original image of the QR code in the first image with the monochrome image of the QR code according to the position.

In some embodiments of the present disclosure, generating a monochrome image of the QR code based on the information may comprise: determining a size of the original image of the QR code according to the position of the original image of the QR code in the first image; and generating the monochrome image of the QR code according to the size of the original image of the QR code.

In some embodiments of the present disclosure, the size of an original image of the QR code may be smaller than or equal to a size of the monochrome image of the QR code.

In some embodiments of the present disclosure, the monochrome image may be a black and white image.

According to another aspect of the present disclosure, there is provided a printing method, including: generating a quick response (QR) code according to the above method; and printing the monochrome image of the QR code.

According to a further aspect of the present disclosure, there is provided a printing apparatus including a processor and a printing device, wherein the processor is configured to: obtain an original image of a quick response (QR) code, wherein the original image of the QR code is a bitmap image and is a color image or a grayscale image; obtain information contained in the QR code; and generate a monochrome image of the QR code based on the information, and the printing device is configured to print out the monochrome image of the QR code.

In some embodiments of the present disclosure, the original image of the QR code may be contained in a first image, and the processor may be further configured to: determine a position of the original image of the QR code in the first image; and overlay the original image of the QR code in the first image with the monochrome image of the QR code according to the position.

In some embodiments of the present disclosure, generating a monochrome image of the QR code based on the information may comprise determining a size of the original image of the QR code according to the position of the original image of the QR code in the first image; and generating the monochrome image of the QR code according to the size of the original image of the QR code.

In some embodiments of the present disclosure, the size of the original image of the QR code may be the same as a size of a monochrome image of the QR code.

In some embodiments of the present disclosure, the monochrome image may be a black and white image.

In some embodiments of the present disclosure, the printing device may be a monochrome printing device.

According to a still further aspect of the present disclosure, there is provided an invoice printing apparatus including a printer and a processor, wherein the processor is configured to obtain an electronic invoice file which contains an original image of a quick response (QR) code, wherein the original image of the QR code is a color image or a grayscale image; obtain information contained in the QR code; generate a monochrome image of the QR code based on the information; and replace the original image of the QR code with the monochrome image of the QR code to generate a new electronic invoice file, and the printer is configured to print out the new electronic invoice file.

In some embodiments of the present disclosure, the processor may be further configured to perform format conversion on the electronic invoice file, so that a format of the electronic invoice file is converted to a bitmap format.

In some embodiments of the present disclosure, the printer may be a monochrome printer.

BRIEF DESCRIPTION OF THE DRAWINGS

The accompanying drawings, which form a part of the specification, describe embodiments of the present disclosure, and, together with the description, serve to explain principles of the present disclosure.

The present disclosure can be more clearly understood with reference to the drawings based on the following detailed descriptions.

Figure 1:
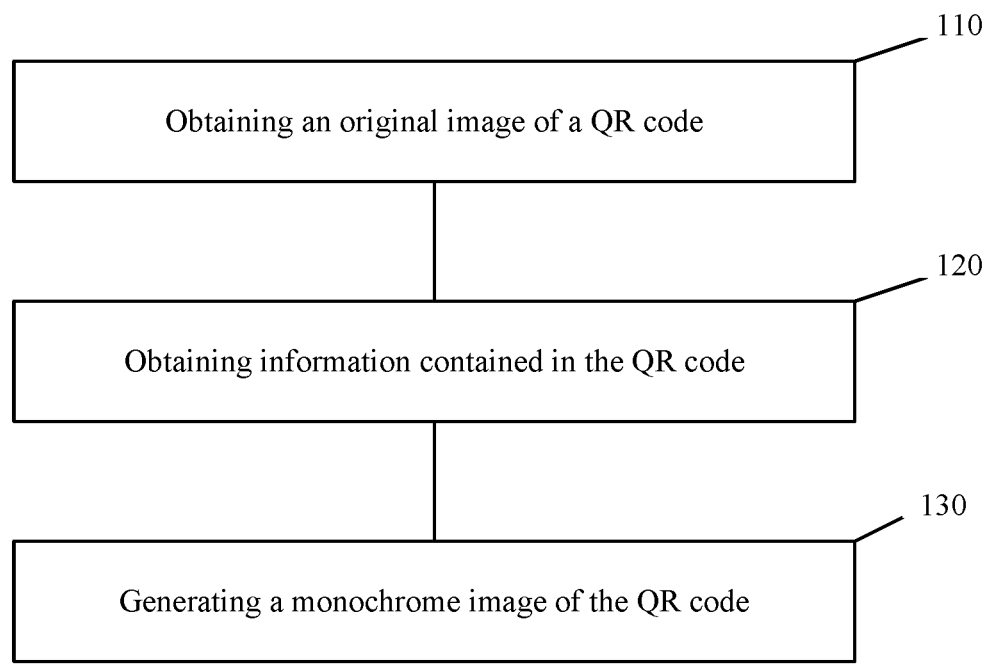
FIG. 1 shows a flowchart of a method for generating a QR code according to an embodiment of the present disclosure.

Note that in the embodiments described below, the same reference number may be commonly used between different drawings to indicate the same portions or portions having the same functions, and repeated descriptions thereof are omitted. In the specification, similar reference numbers and letters are used to indicate similar items, so once an item is defined in one drawing, it need not be discussed further in subsequent drawings.

For ease of understanding, the positions, sizes, ranges of each structure shown in the drawings do not necessarily indicate actual positions, sizes, and ranges. Therefore, the disclosed invention is not limited to the positions, sizes, ranges disclosed in the drawings.

DETAILED DESCRIPTION

Various exemplary embodiments of the present disclosure will now be described in detail with reference to the accompanying drawings. It should be noted that, unless specifically stated otherwise, the relative arrangement of components and steps, numerical expressions, and numerical values set forth in these embodiments do not limit the scope of the present disclosure.

The following description of at least one exemplary embodiment is actually merely illustrative and in no way serves as any limitation on the present disclosure and its application or use.

Techniques, methods, and apparatuses known to those of ordinary skill in the relevant field may not be discussed in detail, but where appropriate, the techniques, methods, and apparatuses should be considered as a part of the specification.

In all examples shown and discussed herein, any specific value should be construed as exemplary only and not as a limitation. Therefore, other examples of the exemplary embodiments may have different values.

Hereinafter, specific embodiments according to the present disclosure will be described in further detail with reference to the accompanying drawings.

Usually, people use monochrome printers (such as black and white printers) to print QR codes. For example, a color image containing a QR code can be input to a monochrome printer for printing.

However, the inventors of the present disclosure noticed that when the color image is a bitmap image (for example, a file with an extension of bmp, jpg, png, gif, etc.), the recognition rate of the QR code printed by the monochrome printer is low.

Figure 3:
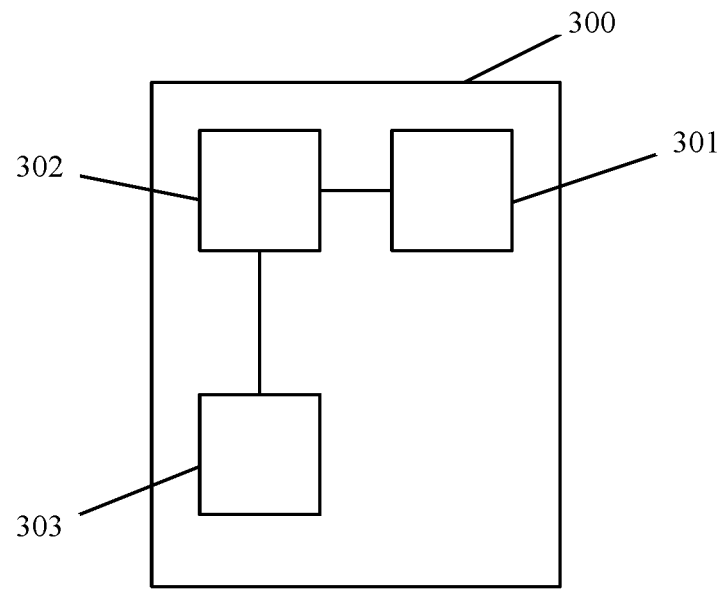
FIG. 3 shows a schematic diagram of a printing apparatus according to an embodiment of the present disclosure.

FIG. 3 illustrates a schematic diagram of an apparatus for printing a QR code according to the present disclosure. As shown in FIG. 3, the apparatus 300 for printing a QR code includes a storage device 301, a processor 302, and a printer 303. The storage device 301 may store an image of a QR code or an image containing a QR code. The processor 302 may process the QR code, generate a monochrome image of the QR code, and replace the original QR code image with the monochrome image. The printer 303 can print the monochrome image of the QR code or the image containing the QR code. In the printed image, the original QR code is replaced with a monochrome image. In addition, in some embodiments according to the present disclosure, the printer 303 may be a monochrome printer, such as a black and white printer or the like.

FIG. 1 illustrates a flowchart of a method of generating a QR code according to an embodiment of the present disclosure. As shown in FIG. 1, the method for generating a QR code mainly includes the following steps.

First, an original image of a QR code is acquired (step 110). The original image of the QR code can be a color image or a grayscale image. Here, the original image is a bitmap. A bitmap image, also known as a raster image, is composed of points called pixels. In the bitmap image, the position and color value of each pixel are recorded. For example, the original image of the QR code may be stored in the storage device 301 in advance, and the processor 302 may read out the original image of the QR code from the storage device 301.

Then, the information contained in the QR code is acquired (step 120). For example, the processor 302 may recognize the QR code by various QR code recognition algorithms, thereby obtaining the information contained in the QR code. In this step, since the processor 302 directly recognizes the original image of the QR code by the QR code recognition algorithm, the recognition rate is relatively high, thereby accurately obtaining the information contained in the QR code.

Finally, the processor 302 generates a monochrome image of the QR code based on the acquired information (step 130). Because the image of the newly generated QR code is a monochrome image (such as a black and white image), even if the newly generated QR code is subsequently printed out by a monochrome printer, it can still have a high recognition rate.

Figure 4:
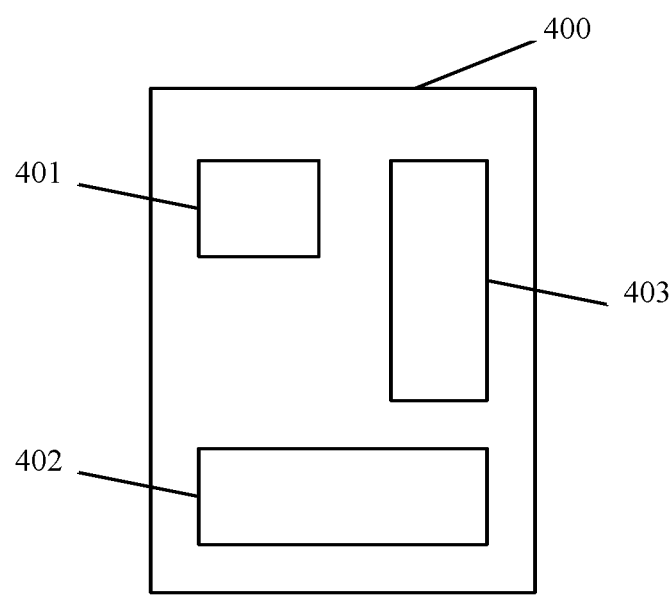
FIG. 4 shows a schematic diagram of a first image according to an embodiment of the present disclosure.

In addition, in many cases, the image to be printed (that is, the first image) may contain other contents besides the QR code. For example, FIG. 4 shows a first image 400 that includes a QR code 401, a text 402, and a picture 403. That is, when the printer prints the first image 400, not only the QR code 401 is printed out, but also the text 402 and the picture 403 are printed. This process will be described below with reference to FIG. 2.

Figure 2:
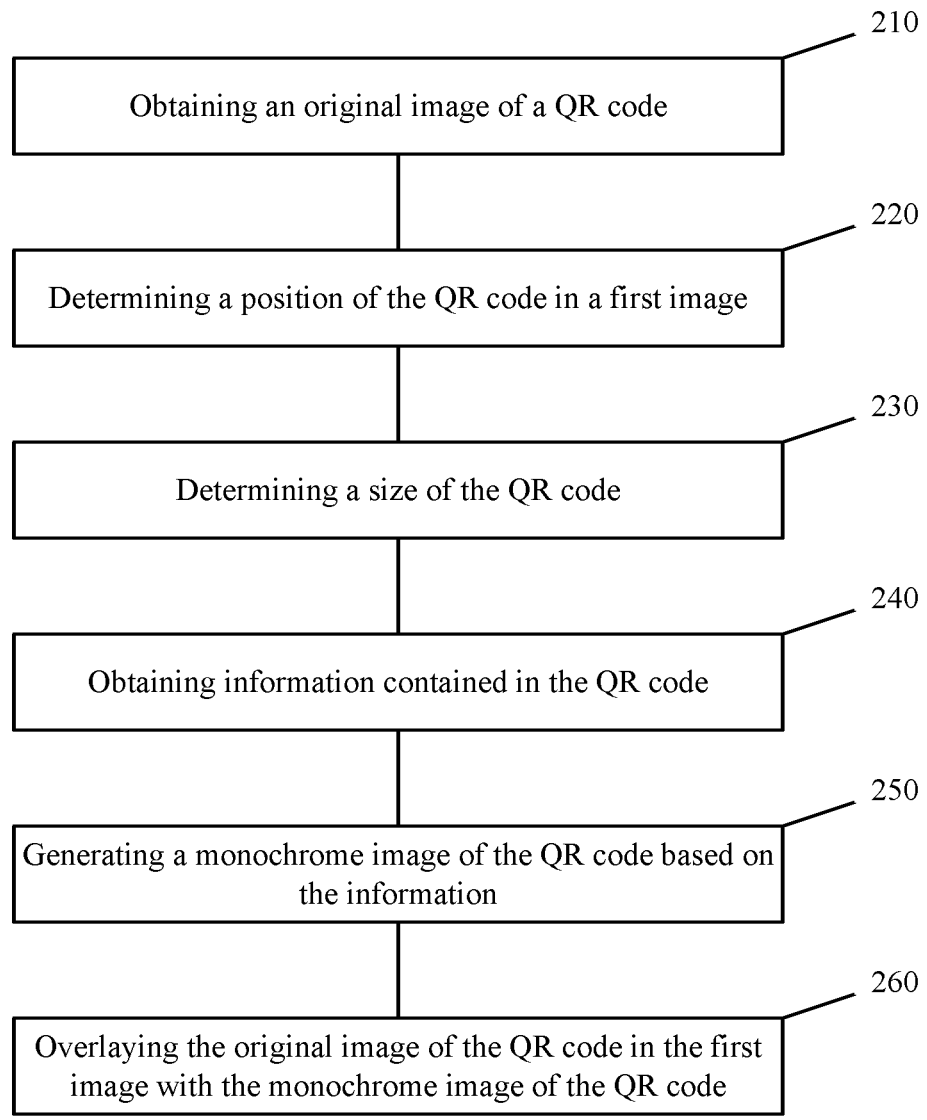
FIG. 2 shows a flowchart of a method of generating a QR code according to an embodiment of the present disclosure.

FIG. 2 illustrates a flowchart of a method of generating a QR code according to an embodiment of the present disclosure. As shown in FIG. 2, the method includes the following steps.

First, an original image of a QR code is acquired (step 210). For example, the processor 302 may read out the first image 400 from the storage device 301. The first image 400 includes multiple contents such as a QR code 401, a text 402, and a picture 403.

Then, the processor 302 may use image recognition to determine the position of the QR code 401 in the first image 400 (step 220). For example, the QR code is usually in a shape of a square, and three out of the four corners are provided with a pattern "", which can be used to determine the position of the QR code. The processor 302 can determine the positions of the four corners of the QR code in the first image 400 through an image recognition algorithm, and can determine the positions of the QR code according to the positions of the four corners.

Next, the processor 302 may determine the size of the QR code (step 230). For example, the processor 302 may obtain the size of the QR code according to the positions of the four corners of the QR code determined in step 220.

Next, the processor 302 can obtain the information contained in the QR code (step 240). For example, the processor 302 may decode the QR code by using a decoding algorithm to obtain the information contained in the QR code.

Next, the processor 302 generates a monochrome image of the QR code based on the information contained in the QR code (step 250). For example, the processor 302 may generate a new QR code, which is a monochrome image, and the information contained in the new QR code is the same as the information contained in the original QR code. In addition, when the processor 302 generates the new QR code, the new QR code has the same size as the original QR code.

Next, the processor 302 may cover the original QR code 401 in the first image 400 with the new QR code, thereby obtaining a new image (step 260). For example, the processor 302 may overlay the new QR code on the original QR code according to the position of the original QR code in the first image 400 obtained in step 220. Since the new QR code is the same size as the original QR code, the original QR code can be completely covered without covering other parts in the first image 400.

Finally, the processor 302 can send the new image to the printer 303 for printing. Since the QR code in the new image is a monochrome image (such as a black and white image), the QR code in the image printed by the printer 303 is also a monochrome image. Further, as described above, in some embodiments according to the present disclosure, the printer 303 may be a monochrome printer, such as a black and white printer or the like.

In addition, in some of the embodiments of the present disclosure, the size of the new QR code may be larger than the size of the original QR code. In this way, the new QR code may still completely cover the original QR code.

People can use a camera of a mobile device (such as a cell phone) or other device to capture an image printed by the printer 303, thereby recognizing the QR code in the image. The inventors of the present disclosure noticed that compared with the prior art where the monochrome printer 303 directly prints the first image 400 and then the mobile device performs capturing and recognition processes, the new image obtained through the above processing procedure of the present disclosure has a higher recognition rate. That is, when the QR code is captured by the camera and is recognized by the captured image, the monochrome image of the QR code printed by the monochrome printer 303 is more easily recognized. If the color image or grayscale image of the QR code is printed directly by the monochrome printer 303, the problem of unrecognizable or incorrect recognition often occurs.

Electronic invoices are now widely used. On an electronic invoice, a QR code is usually provided, and people can scan and recognize the QR code on the electronic invoice through a device such as a mobile phone to confirm the information of the electronic invoice. In this way, for example, the authenticity of the electronic invoice can be identified, repeated reimbursement with the same electronic invoice can be prevented, or the electronic invoice can be quickly entered into a system. Electronic invoices are usually provided by, for example, tax bureaus, for example, as documents in pdf format. However, if the electronic invoice provided by the tax bureau is printed directly through a monochrome printer, the QR code on the electronic invoice is usually a color image or a grayscale image. As mentioned above, in this case, the recognition rate of the QR code in the printed invoice is low.

Figure 5:
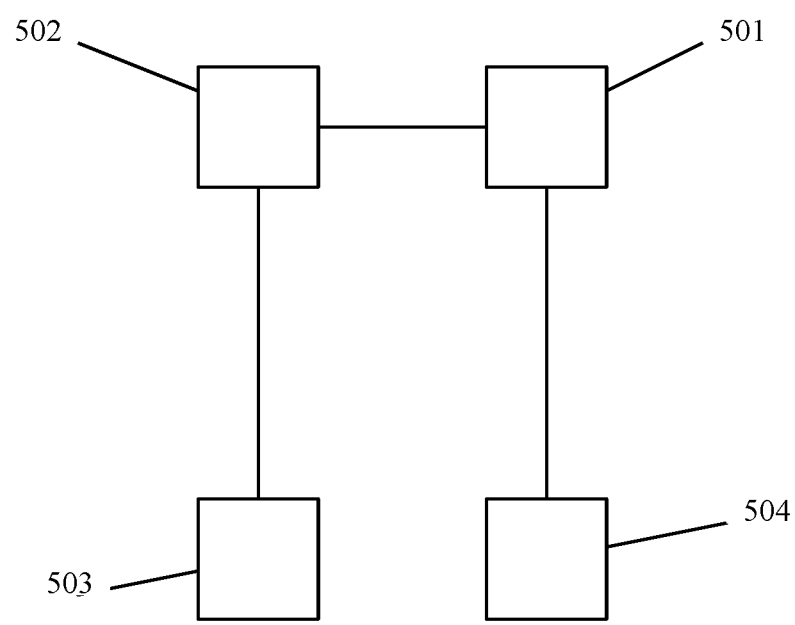
FIG. 5 shows a schematic diagram of an invoice printing apparatus according to an embodiment of the present disclosure.

FIG. 5 illustrates an invoice printing apparatus according to some embodiments of the present disclosure. As shown in FIG. 5, the invoice printing apparatus 500 includes a receiving device 504, a storage device 501, a processor 502, and a printer 503.

The receiving device 504 may receive, for example, an electronic invoice file transmitted from a server of the tax bureau and store it in the storage device 501. The electronic invoice file may be in a bitmap format or other formats, such as a PDF format. The QR code is included in the electronic invoice, and the image of the QR code is usually a color image or a grayscale image.

When the electronic invoice needs to be printed, the processor 502 obtains the electronic invoice file from the storage device 501.

The processor 502 may then determine the position and size of the QR code in the electronic invoice by, for example, image recognition.

In some embodiments according to the present disclosure, if the format of the electronic invoice is not a bitmap format, for example, the format is PDF format or other formats, etc., the processor 502 may further perform a format conversion operation on the electronic invoice file before performing the image recognition operation. The format of the electronic invoice file is thus converted into a bitmap format.

Next, the processor 502 can obtain the information contained in the QR code.

Next, the processor 502 may generate an image of a new QR code based on the information contained in the QR code. The image of the new QR code is a monochrome image (e.g., a black and white image) and contains the same information as the original QR code. In addition, the size of the image of the new QR code is also the same as that of the original QR code.

The processor 502 then overlays the image of the new QR code on the image of the original QR code to obtain a new electronic invoice file.

Finally, the processor 502 sends the new electronic invoice file to the printer 503, and the printer 503 prints out a paper invoice.

In some embodiments according to the present disclosure, the printer 503 may be a monochrome printer, such as a black and white printer.

With the invoice printing apparatus of the present disclosure, the QR code on the printed paper invoice can be more easily identified and has a higher recognition rate.

In the description of the present disclosure, the term "monochrome image" means that the pixel value of each pixel in the image can take one of two values (for example, black and white). For most applications, a preferred example of a monochrome image is a black and white image. However, in some applications, other monochrome image schemes may also be adopted, such as including only red and white pixels, or in another example only green and white pixels. Therefore, in the present disclosure, a "grayscale image is not a "monochrome image" because the pixel value of each pixel in the grayscale image includes values of grayscale scales in addition to black and white.

According to some embodiments of the present disclosure, following technical solutions may be provided:

1. A method for generating a quick response (QR) code, comprising:
    obtaining an original image of the QR code, wherein the original image of the QR code is a bitmap image and is a color image or a grayscale image;
    obtaining information contained in the QR code; and
    generating a monochrome image of the QR code based on the information.
2. The method according to 1, wherein the original image of the QR code is included in a first image, and the method further comprises:
    determining a position of the original image of the QR code in the first image; and
    overlaying the original image of the QR code in the first image with the monochrome image of the QR code according to the position.
3. The method according to 2, wherein generating a monochrome image of the QR code based on the information comprises:
    determining a size of the original image of the QR code according to the position of the original image of the QR code in the first image; and
    generating the monochrome image of the QR code according to the size of the original image of the QR code.

4. The method according to 3, wherein the size of an original image of the QR code is smaller than or equal to a size of the monochrome image of the QR code.
5. The method according to any one of 1-4, wherein the monochrome image is a black and white image.
6. A printing method, including:
   generating a quick response (QR) code according to the method of any one of 1-5; and
   printing the monochrome image of the QR code.
7. A printing apparatus including a processor and a printing device, wherein:
   the processor is configured to:
      obtain an original image of a quick response (QR) code, wherein the original image of the QR code is a bitmap image and is a color image or a grayscale image;
      obtain information contained in the QR code; and
      generate a monochrome image of the QR code based on the information, and
   the printing device is configured to print out the monochrome image of the QR code.
8. The printing apparatus according to 7, wherein the original image of the QR code is contained in a first image, and the processor is further configured to:
   determine a position of the original image of the QR code in the first image; and
   overlay the original image of the QR code in the first image with the monochrome image of the QR code according to the position.
9. The printing apparatus according to 8, wherein generating a monochrome image of the QR code based on the information comprises:
   determining a size of the original image of the QR code according to the position of the original image of the QR code in the first image; and
   generating the monochrome image of the QR code according to the size of the original image of the QR code.
10. The printing apparatus according to 9, wherein the size of the original image of the QR code is the same as a size of a monochrome image of the QR code.
11. The printing apparatus according to any one of 7 to 10, wherein the monochrome image is a black and white image.
12. The printing apparatus according to 7, wherein the printing device is a monochrome printing device.
13. An invoice printing apparatus including a printer and a processor, wherein:
    the processor is configured to:
       obtain an electronic invoice file which contains an original image of a quick response (QR) code, wherein the original image of the QR code is a color image or a grayscale image;
       obtain information contained in the QR code;
       generate a monochrome image of the QR code based on the information; and
       replace the original image of the QR code with the monochrome image of the QR code to generate a new electronic invoice file, and
    the printer is configured to print out the new electronic invoice file.
14. The invoice printing apparatus according to 13, wherein the processor is further configured to:
    perform format conversion on the electronic invoice file, so that a format of the electronic invoice file is converted to a bitmap format.
15. The invoice printing apparatus according to 13, wherein the printer is a monochrome printer.

The words "front", "back", "top", "bottom", "above", "below", etc. in the specification and claims, if present, are used for descriptive purposes and not necessarily describes an unchanged relative position. It should be understood that the terms so used are interchangeable under appropriate circumstances such that the embodiments of the disclosure described herein can, for example, be used in other orientations than those shown or otherwise described herein.

As used herein, the word "exemplary" means "serving as an example, instance, or illustration," rather than as a "model" that will be accurately reproduced. Any embodiment described exemplarily herein is not necessarily to be construed as preferred or advantageous over other embodiments. Moreover, the present disclosure is not limited by any expressed or implied theory given in the above technical field, background art, summary or detailed descriptions.

As used herein, the word "substantially" is meant to include any small changes caused by a design or manufacturing defect, tolerance of a device or element, environmental impact, and/or other factors. The word "substantially" also allows for differences from a perfect or ideal situation caused by parasitic effects, noise, and other practical considerations that may be present in an actual embodiment.

In addition, for reference purposes only, certain terms may also be used in the description, and thus are not intended to be limiting. For example, the terms "first", "second", and other such numerical words do not imply a sequence or order unless clearly indicated by context.

It should also be understood that the words "comprising/including" when used herein indicates the presence of stated features, steps, operations, units and/or components, but does not exclude the presence or addition of one or more other features, steps, operations, units and/or components and/or combination thereof.

Those skilled in the art will appreciate that the boundaries between the operations described above are merely illustrative. Multiple operations can be combined into a single operation, a single operation can be distributed among additional operations, and operations can be performed at least partially overlapping in time. Moreover, alternative embodiments may include multiple instances of a particular operation, and the order of operations may be changed in other various embodiments. However, other modifications, changes, and substitutions are also possible. Accordingly, the description and drawings are to be regarded as illustrative rather than restrictive.

Although some specific embodiments of the present disclosure have been described in detail through examples, those skilled in the art should understand that the above examples are only for the purpose of illustration and not for limiting the scope of the present disclosure. The embodiments disclosed herein can be arbitrarily combined without departing from the scope of the present disclosure. Those skilled in the art should also understand that various modifications can be made to the embodiments without departing from the scope of the present disclosure. The scope of the present disclosure is defined by the appended claims.

What is claimed is:
1. A method for generating a quick response (QR) code, comprising:
   obtaining an original image of the QR code, wherein the original image of the QR code is a bitmap image and is a color image or a grayscale image;
   obtaining information contained in the QR code; and generating a monochrome image of the QR code based on the information, wherein a size of the original image of the QR code is smaller than the monochrome image of the QR code.

2. The method according to claim 1, wherein the original image of the QR code is included in a first image, and the method further comprises:
determining a position of the original image of the QR code in the first image; and
overlaying the original image of the QR code in the first image with the monochrome image of the QR code according to the position.

3. The method according to claim 2, wherein the generating the monochrome image of the QR code based on the information comprises:
determining the size of the original image of the QR code according to the position of the original image of the QR code in the first image; and
generating the monochrome image of the QR code according to the size of the original image of the QR code.

4. The method according to claim 1, wherein the monochrome image is a black and white image.

5. The method according to claim 1, further comprising:
printing the monochrome image of the QR code.

6. An apparatus comprising:
a processor; and
a printing device coupled to the processor, wherein the processor is configured to:
obtain an original image of a quick response (QR) code, wherein the original image of the QR code is a bitmap image;
obtain information contained in the QR code;
generate a monochrome image of the QR code based on the information, wherein a size of the original image of the QR code is smaller than the monochrome image of the QR code; and print the monochrome image of the QR code.

7. The apparatus according to claim 6, wherein the original image of the QR code is contained in a first image, and the processor is further configured to:
determine a position of the original image of the QR code in the first image; and
overlay the original image of the QR code in the first image with the monochrome image of the QR code according to the position.

8. The apparatus according to claim 7, wherein to generate the monochrome image of the QR code based on the information, the processor is configured to:
determine the size of the original image of the QR code according to the position of the original image of the QR code in the first image; and
generate the monochrome image of the QR code according to the size of the original image of the QR code.

9. The apparatus according to claim 6, wherein the monochrome image is a black and white image.

10. The apparatus according to claim 6, wherein the printing device is a monochrome printing device.

11. An invoice printing apparatus comprising:
a printer; and
a processor coupled to the printer, wherein the processor is configured to
obtain an electronic invoice file comprising an original image of a quick response (QR) code, wherein the original image of the QR code is a color image;
obtain information contained in the QR code;
generate a monochrome image of the QR code based on the information; and
replace the original image of the QR code with the monochrome image of the QR code to generate a new electronic invoice file, wherein
the printer is configured to print the new electronic invoice file.

12. The invoice printing apparatus according to claim 11, wherein the processor is further configured to:
perform format conversion on the electronic invoice file to a bitmap format.

13. The invoice printing apparatus according to claim 11, wherein the printer is a monochrome printer.

14. The invoice printing apparatus according to claim 11, wherein the processor is further configured to:
determine a position of the original image of the QR code; and
overlay the original image of the QR code with the monochrome image of the QR code according to the position.

15. The invoice printing apparatus according to claim 14, wherein to generate the monochrome image of the QR code based on the information, the processor is configured to:
determine a size of the original image of the QR code according to the position of the original image of the QR code in a first image; and
generate the monochrome image of the QR code according to the size of the original image of the QR code.

16. The invoice printing apparatus according to claim 15, wherein the size of the original image of the QR code is the same as a size of the monochrome image of the QR code.

17. The invoice printing apparatus according to claim 15, wherein the size of the original image of the QR code is smaller than a size of the monochrome image of the QR code.

* * * * *